US009626145B1

(12) United States Patent
Fu et al.

(10) Patent No.: US 9,626,145 B1
(45) Date of Patent: Apr. 18, 2017

(54) TILEABLE DISPLAY WITH PIXEL-TAPE

(71) Applicant: Google Inc., Mountain View, CA (US)

(72) Inventors: Belle Fu, Taipei (TW); Mary Lou Jepsen, Sausalito, CA (US); Nicholas C. Loomis, San Francisco, CA (US); Behnam Bastani, San Jose, CA (US); Carlin J. Vieri, Menlo Park, CA (US); Andrei S. Kazmierski, Pleasanton, CA (US); Adam E. Norton, Palo Alto, CA (US); Stephen D. Dorow, San Francisco, CA (US); Stuart C. B. Abercrombie, Morgan Hill, CA (US)

(73) Assignee: X Development LLC, Mountain View, CA (US)

( * ) Notice: Subject to any disclaimer, the term of this patent is extended or adjusted under 35 U.S.C. 154(b) by 218 days.

(21) Appl. No.: 14/318,137

(22) Filed: Jun. 27, 2014

(51) Int. Cl.
*G06F 3/038* (2013.01)
*G06F 3/14* (2006.01)

(52) U.S. Cl.
CPC .................................. *G06F 3/1446* (2013.01)

(58) Field of Classification Search
USPC .......................................................... 345/204
See application file for complete search history.

(56) References Cited

U.S. PATENT DOCUMENTS

| | | | | |
|---|---|---|---|---|
| 8,013,816 B2 | 9/2011 | Kim | | |
| 2005/0078104 A1* | 4/2005 | Matthies | G02F 1/13336 | 345/204 |
| 2006/0044215 A1* | 3/2006 | Brody | G06F 3/1446 | 345/1.3 |
| 2006/0055864 A1 | 3/2006 | Matsumura et al. | | |
| 2009/0079681 A1 | 3/2009 | Chang et al. | | |
| 2012/0120007 A1 | 5/2012 | Choi et al. | | |
| 2012/0256534 A1 | 10/2012 | Lee et al. | | |
| 2014/0168185 A1* | 6/2014 | Han | G06F 3/1446 | 345/211 |

FOREIGN PATENT DOCUMENTS

WO WO 2014/070684 A1 5/2014

* cited by examiner

*Primary Examiner* — Gustavo Polo
(74) *Attorney, Agent, or Firm* — Blakely Sokoloff Taylor & Zafman LLP

(57) ABSTRACT

A display tile for arranging with other display tiles to form a multi-tile display includes display pixels in an active display area, pixel tape sections, and a transparent layer. The pixel tape sections surround the display pixels. Each pixel tape section overlaps an adjacent pixel tape section and is overlapped by another adjacent pixel tape section disposed opposite the adjacent pixel tape section. Each pixel tape section includes a pixel array. The transparent layer is disposed over the display pixels and the pixel arrays of the pixel tape sections. The display pixels and the pixel arrays are arranged to display an overall image of the display tile.

23 Claims, 6 Drawing Sheets

CROSS SECTION X3
(FIRST EMBODIMENT)

CROSS SECTION X2

CROSS SECTION X3
(FIRST EMBODIMENT)

CROSS SECTION X3
(SECOND EMBODIMENT)

TILEABLE DISPLAY WITH PIXEL-TAPE

TECHNICAL FIELD

This disclosure relates generally to displays, and in particular but not exclusively, relates to tileable display panels.

BACKGROUND INFORMATION

Large displays can be prohibitively expensive as the cost to manufacture display panels rises exponentially with display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

Tiling multiple smaller, less expensive display panels together can achieve a large multi-panel display, which may be used as a large wall display. The individual images displayed by each display panel may constitute a sub-portion of the larger multi-tile image collectively displayed by the multi-panel display. While a multi-panel display can reduce costs, visually it has a major drawback. Specifically, bezel regions that surround the displays put seams or cracks in the overall-image displayed by the multi-panel display. These seams are distracting to viewers and detract from the overall visual experience. Tileable displays that could be arranged as a multi-tile display that reduced or eliminated distracting seams between the tileable display panels are desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a display tile and a multi-tile display are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
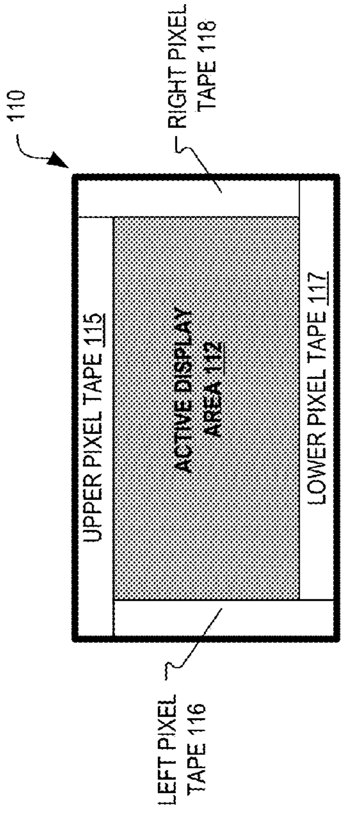
FIG. 1A illustrates a display tile that includes an active area surround by pixel tape sections, in accordance with an embodiment of the disclosure.

FIG. 1A illustrates a display tile 110 that includes an active display area 112 surrounded by pixel tape sections 115, 116, 117, and 118, in accordance with an embodiment of the disclosure. Active display area 112 includes display pixels. The display pixels in active display area 112 may utilize liquid crystal display ("LCD") technology. The LCD may be backlit. Each of upper pixel tape 115, left pixel tape 116, lower pixel tape 117, and right pixel tape 118 include pixel arrays. Pixel tape sections 115-118 and display pixels of active display area 112 are arranged to display an overall image. Corresponding electronics within display tile 110 are configured to drive the overall image on pixel tape sections 115-118, and active display area 112. The terms "pixel tape" or "pixel tape section" are used broadly in this disclosure to refer to a pixel array module that includes a pixel array segment that adds display capabilities adjacent to display area(s). The "pixel tape" or "pixel tape section" need not be rectangular pixel arrays, although the "display area(s)" may typically be rectangular pixel arrays.

Figure 1B:
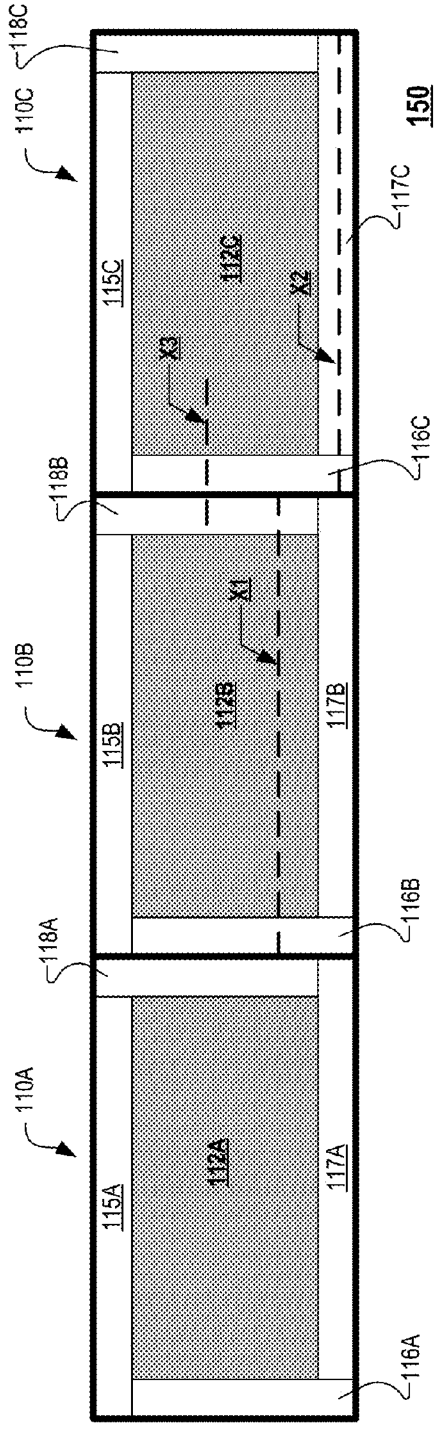
FIG. 1B illustrates a multi-tile display that includes a plurality of the display tiles of FIG. 1A, in accordance with an embodiment of the disclosure.

FIG. 1B illustrates a multi-tile display 150 that includes a plurality of the display tiles of FIG. 1A, in accordance with an embodiment of the disclosure. Display tile 110B is arranged between display tile 110A and 110C. Right pixel tape 118A abuts left pixel tape 116B and right pixel tape 118B abuts left pixel tape 116C. FIG. 1B illustrates three display tiles 110 that are arranged to display a multi-tile image, however it is contemplated that many display tiles 110 can be arranged in different configurations (e.g. 3×3, 4×4, 4×3) to form a multi-tile display for displaying multi-tile images. Image driving modules may need to utilized to accommodate rendering a multi-tile image to the multi-tile display, depending on the number and arrangement of display tiles 110 in the multi-tile display.

Figure 3:
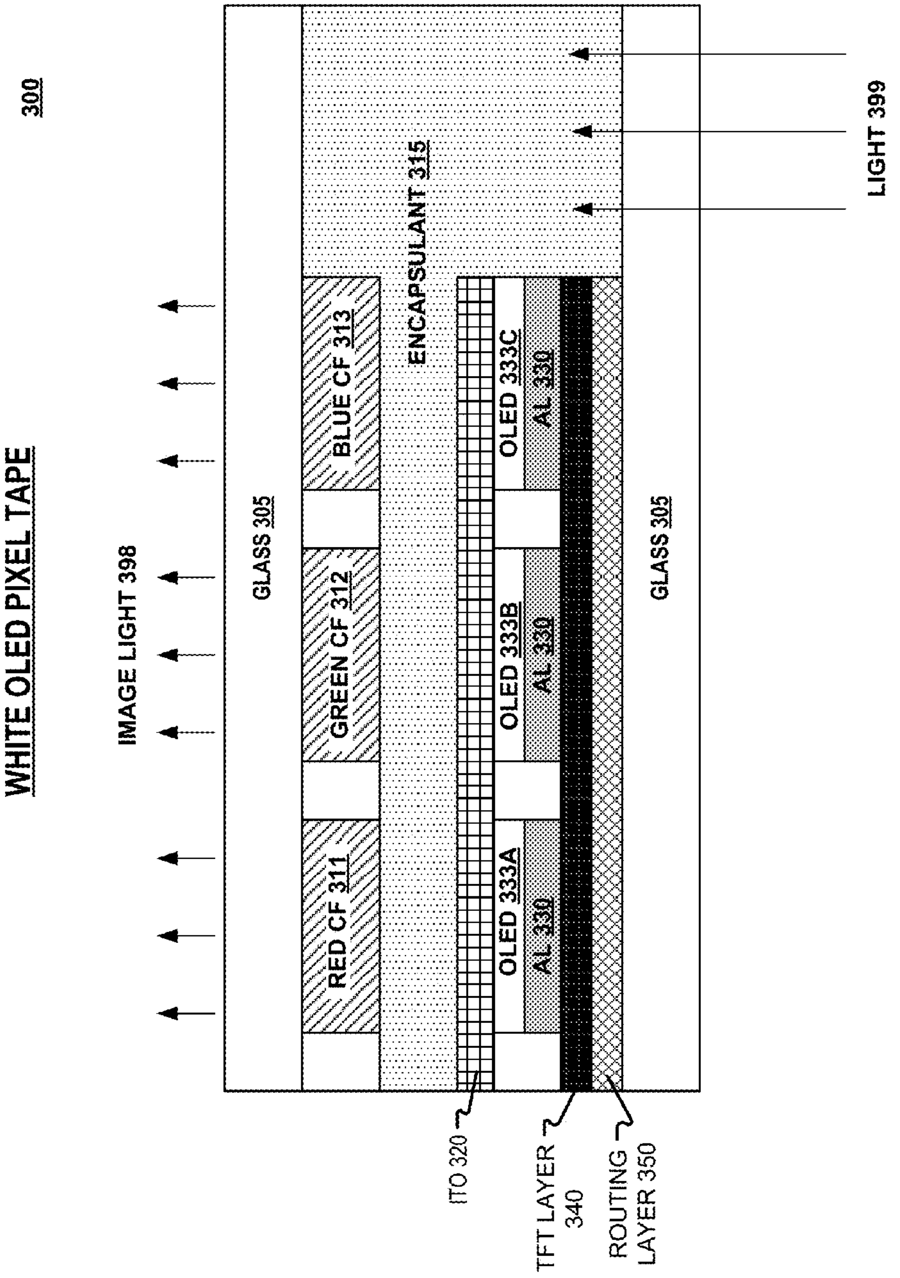
FIG. 3 illustrates an example configuration of a pixel tape that includes white organic light-emitting-diodes ("OLEDs"), in accordance with an embodiment of the disclosure.

The pixel arrays in the pixel tape sections 115, 116, 117, and 118 may utilize backlit LCD technology or organic light-emitting-diode ("OLED") technology. FIG. 3 illustrates an example configuration of a pixel tape that includes white organic light-emitting-diodes ("OLEDs"), in accordance with an embodiment of the disclosure. FIG. 3 shows a cross-section view of an end of an example pixel tape 300. In FIG. 3, routing layer 350 is disposed upon glass 305 and thin-film-transistor ("TFT") layer 340 is disposed upon routing layer 350. Glass 305 is 0.1 mm thick in one embodiment. In one embodiment, glass 305 is initially disposed as 0.5-0.7 mm thick and then thinned to a thickness between 0.1 and 0.2 mm. In one embodiment, a flexible substrate is used in place of glass 305.

TFT layer 340 includes transistors and other driving electronics required to modulate and drive white OLEDs 333, which are disposed above TFT layer 340. Routing layer 350 routes the proper electronic control signals (from an image driving module, as an example) to be received by TFT layer 340. White OLEDs 333 are disposed between aluminum layer 330 and ITO layer 320 in FIG. 3. The primary functions of ITO layer 320 and aluminum layer are to serve as electrodes for each OLED pixel 333. Aluminum layer 330 may provide heat sinking properties to expedite heat dissipation from OLEDs 333. Aluminum layer 330 may also provide reflective properties to increase the efficiency of OLEDs 333 by redirecting light emitted by OLEDs 333 toward the corresponding color filter. ITO layer 320 is disposed above OLEDs 333. ITO layer 320 is a transparent (at least in the visible spectrum) conductive material that may be electrically connected as a power rail to the anode of OLEDs 333.

In operation, white OLEDs 333 are selectively driven to emit white light that illuminates (and propagates through) the color filter that is disposed above the given OLED 333. In the red/green/blue pixel illustrated in FIG. 3, OLED 333A illuminates Red color filter 311, OLED 333B illuminates Green color filter 312, and OLED 333C illuminates Blue color filter 313. Red color filter 311 passes red light, green color filter 312 passes green light, and Blue color filter 313 passes blue light, which are included in image light 398. In this way, a pixel can generate any color of light by selectively driving OLEDs 333 to mix red, green, and blue light. It is appreciated (although not shown in FIG. 3) that pixel tape 300 includes a two dimensional array of pixels (e.g. 1080×100) that generates images. It is appreciated by those skilled in the art that instead of using white OLEDs 333 in combination with color filters (as the illustrated example of FIG. 3), red, green, and blue ("RGB") OLEDs that emit red, green, and blue light may be used to generate red, green, and blue image light 398. Additionally, pixel tape sections 115, 116, 117, and 118 may also use backlit LCD technology, quantum dot LEDs, and/or micro LEDs rather than OLED technology to generate images.

Encapsulant 315 is disposed between the white OLEDs and their corresponding color filters, but encapsulant 315 is transparent to visible light which allows the emitted white light to reach the color filters and eventually exit through glass 305 as image light 398. Encapsulant 315 may include melted silicone or self-healing glass. In one embodiment, encapsulant includes desiccant from JSR Corporation of Japan. Encapsulant 315 may serve to bond the OLED structures to the color filter structures. In FIG. 3, the outside edge of pixel tape 300 is transparent to light 399 because light 399 only encounters glass 305 and encapsulant 315 as it propagates through pixel tape 300. As will be explained below, light 399 is generated from active display area 112, which is disposed beneath pixel tape 300.

Figure 2A:
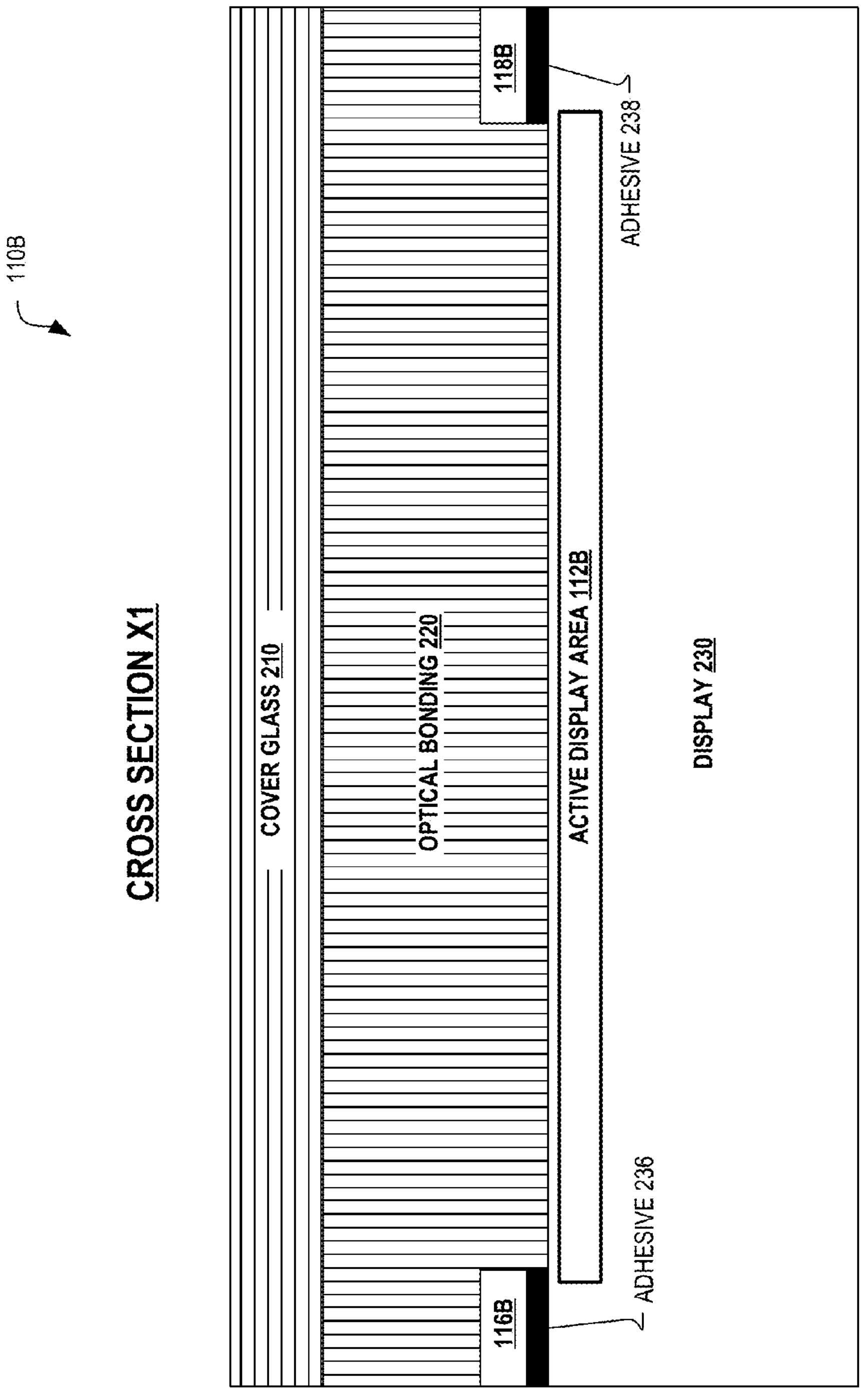
FIG. 2A shows a cross-section view of a display tile that includes pixel tape sections adhered to a display, in accordance with an embodiment of the disclosure.

FIG. 2A shows a cross-section view of display tile 110B that includes pixel tape sections 116B and 118B adhered to a display 230, in accordance with an embodiment of the disclosure. The cross-section is along line X1 in FIG. 1B. Display 230 includes active display area 112B. Pixel tape section 116B and 118B are adhered above inactive areas that surround active display area 112B. Active display area 112B may be an LCD backlit by LEDs or cold-cathode-fluorescents ("CCFLs"). Active display area 112 may also include other display technologies including white OLED, RGB OLED, quantum dot LED, micro RGB LED, or otherwise. The structure illustrated in FIG. 3 may be utilized as pixel tape sections 116B and 118B and as the pixel tape sections illustrated in FIG. 1B. Pixel tape sections 116B and 118B are adhered to display 230 with adhesive 236 and 238, respectively. It is appreciated that pixel tape sections 115B and 117B (not illustrated) are also adhered to display 230 using an adhesive. In one embodiment, 3M™ Optical Clear Adhesive is used as adhesive with a minimum thickness of 50 um.

The transparent layer in FIG. 2A includes optical bonding 220 and cover glass 210. The transparent layer is disposed over display pixels of active display area 112B and over the pixel tape sections 115B-118B. Optical bonding layer 220 is disposed between the pixel tape sections 115B-118B in addition to above the pixel tape sections 115B-118B. Optical bonding 220 and cover glass 210 have the same or similar refractive index, in one embodiment. After the pixel tape sections 115B-118B are adhered to display 230, optical bonding layer 220 is formed over display 230 and the pixel tape sections. Subsequently, the cover glass is bonded to the optical bonding layer 220. Optical bonding layer 220 includes 3M™ Liquid Optical Clear Adhesive ("LOCA"), in one embodiment. Cover glass 210 may be replaced with suitably robust and transparent non-glass substitutes, in some embodiments. In one embodiment, cellulose triacetate ("TAC") is used as cover glass 210. In another embodiment, polyethylene terephthalate is used as cover glass 210. Hard coating and anti-glare layers may be added to the transparent layer. Cover glass 210 may be between 0.5-1 mm thick, in one embodiment. The total height of the pixel tape sections and the adhesive beneath them may be 0.3-0.5 mm, in some embodiments. The thickness of optical bonding layer 220 may be 1-2 mm from display 230 to cover glass 210.

Figure 2B:
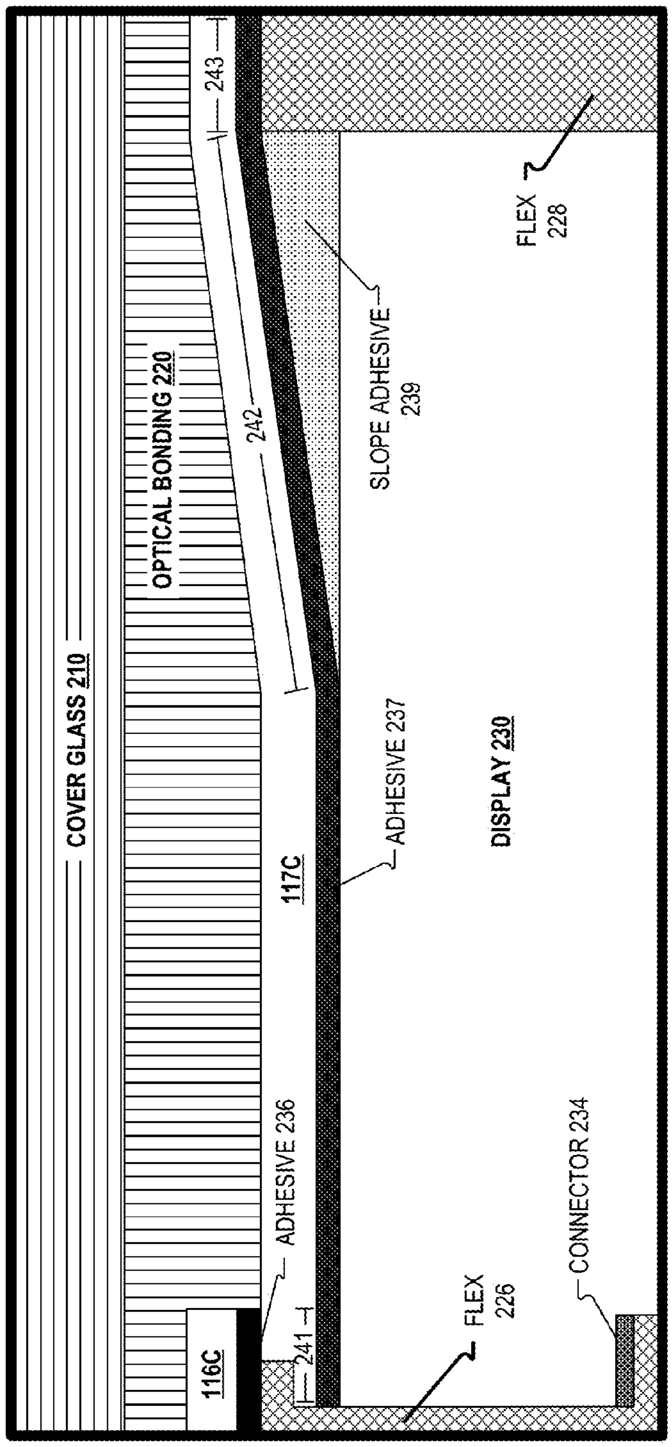
FIG. 2B shows a cross-section view of a display tile that shows a pixel tape section that includes an overlapped end, a ramping midsection, and an overlapping end, in accordance with an embodiment of the disclosure.

FIG. 2B shows a cross-section view of display tile 110B that shows pixel tape section 117C that includes an overlapped end 241, a ramping midsection 242, and an overlapping end 243, in accordance with an embodiment of the disclosure. The cross-section is along line X2 in FIG. 1B. In FIG. 2B, an overlapping end of pixel tape section 116C overlaps overlapped end 241 of pixel tape section 117C. Although not shown, overlapping end 243 overlaps an overlapped end of pixel tape section 118C. Similarly, an overlapping end of pixel tape section 118C overlaps an overlapped end of pixel tape section 115C, which has an overlapping end that overlaps an overlapped end of pixel tape section 116C. In this way, the pixel tape sections are weaved together and surround active display area 112C.

Other geometric configurations are possible that include pixel tape sections weaved together and overlapping (and being overlapped) by their adjacent pixel sections. The pixel tape sections overlap active display area 112 and each pixel tape section overlaps at least one other pixel tape section. The overlapping configuration allows electrical connections and electronics to be connected and disposed in the overlapped regions while still displaying a contiguous overall image that hides or disguises seams (if any) between pixel tape sections and the active display area when viewed from a position orthogonal to active display region 112.

In FIG. 2B, flex circuit 226 is run along the outer walls of display 230 and coupled to overlapped end 241 of pixel tape section 117C. Similarly, flex circuit 228 is run along the outer walls of display 230 and coupled to the overlapped end of pixel tape section 118C (not illustrated). Flex circuits 226 is coupled to connector 234 which provides the electrical signal for driving images on pixel tape section 117C. Flex circuits 226 may simply include routing traces or may also include circuitry and or processors for driving the pixel array included in pixel tape section 117C. Flex circuit 226 is the same or similar to flex circuit 228.

To enable the overlapping of the pixel tapes sections, each pixel tape section must rise from the overlapped end 241 to the overlapping end 243. In one embodiment, the rise is steady and continuous and the pixel tape section is disposed essentially flat, but on a gradual incline. In FIG. 2B, ramp midsection 242 effects the rise from overlapped end 241 to overlapping end 243. A portion of pixel tape section 117C between overlapped end 241 and ramp midsection 242 is flat in FIG. 2B. After the flat portion, ramp midsection 242 rises to overlapping end 243. Adhesive layer 237 is disposed under pixel tape section 117C. Slope adhesive 239 is disposed under ramp midsection 242 to mechanically supporting ramp midsection 242 and the portion of adhesive layer 237 that is disposed directly under ramp midsection 242. In one embodiment, slope adhesive 239 and adhesive layer 237 are a contiguous material formed during the same process step. Slope adhesive 239 includes 3M™ Liquid Optical Clear Adhesive, in one embodiment. In the example illustration of FIG. 2B, ramp midsection 242 is only a minority portion of each overall pixel tape section and each overlapping end of each pixel tape section overlaps a minority portion of its neighboring pixel tape section.

Figure 2C:
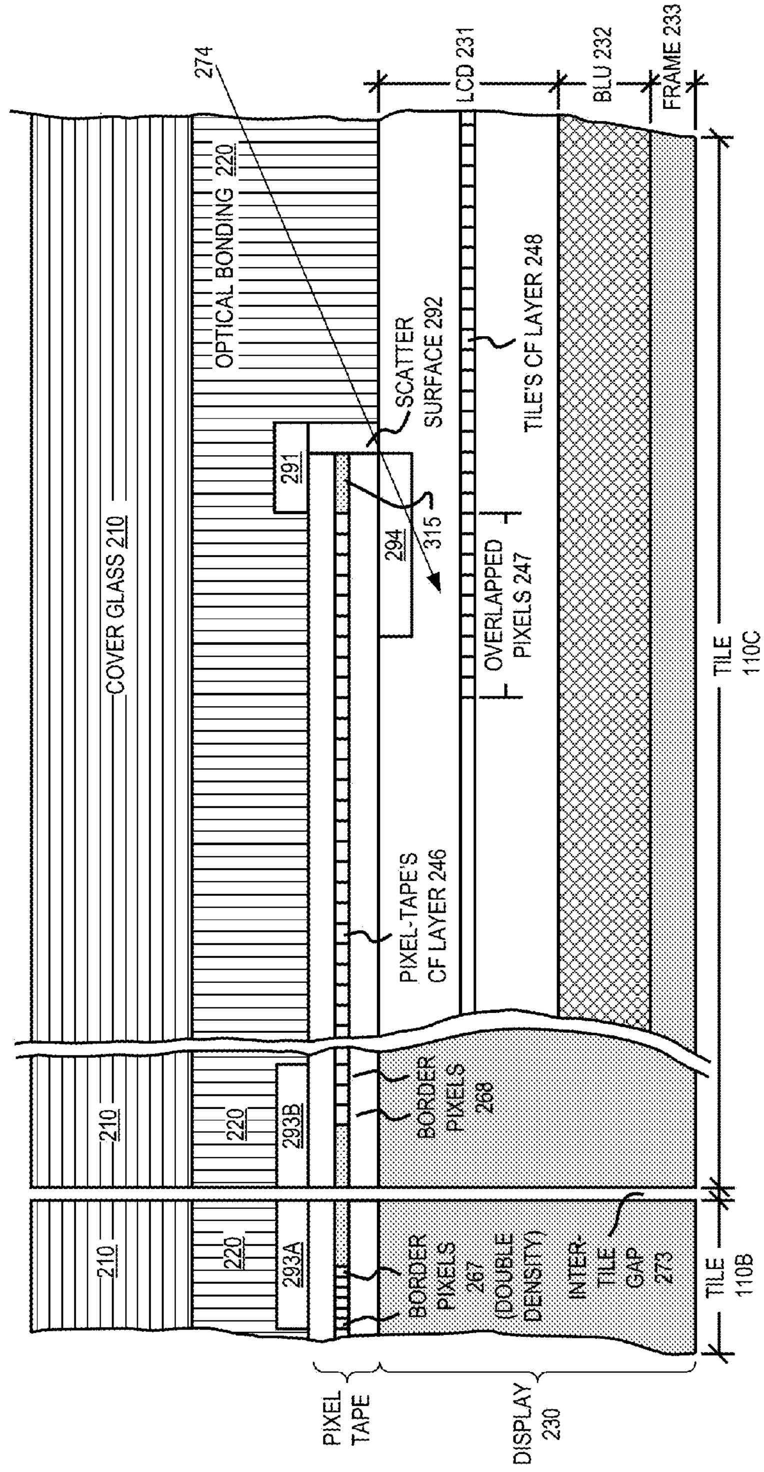
FIG. 2C shows a cross-section view of two example display tiles and an inter-tile gap, in accordance with an embodiment of the disclosure.

FIG. 2C shows a cross-section view of two example display tiles 110B and 110C and an inter-tile gap 273, in accordance with an embodiment of the disclosure. The cross-section is along line X3 in FIG. 1B. In FIG. 2C, display 230 includes a frame 233 and a backlight unit 232 backlighting LCD 231. LCD 231 includes color filter layer 248. FIG. 2C illustrates a pixel tape color filter layer 246 included in pixel tape section 116C.

Border pixels 267 shows that each pixel array in a pixel tape section may include increased pixel density at outside edges of the pixel tape sections that follow perimeters of tiles 110, in some embodiments. Increasing the pixel density near the outside edge of the pixel tape may increase the luminance output near the inter-tile gap 273, which may assist in disguising the inter-tile gap 273 from viewers of multi-tile display 150. Increasing the pixel density near the outside edge of the pixel tape may also increase the ability for software running in display 230 to adjust and smooth images generated by pixel tape sections so that the images appear seamless at inter-tile gap 273. In one embodiment, a consumer captures an image of multi-tile display 150 while multi-tile display 150 displays an overall image that is a calibration image. Tiles 110 then receive the captured image and adjust border pixels 267 based on receiving the captured image. Border pixels 268 (on the outside edge of pixel tape 116C) or border pixels 267 (on the outside edge of pixel tape 118B) may also be configured to output more luminance than other pixels in the pixel arrays of the pixel tape sections to disguise inter-tile gap 273. The configuration of those pixels may include driving the OLEDs with increased electrical power and/or using higher luminance OLED materials.

FIG. 2C illustrates optional scatter surfaces 293A and 293B which are disposed over pixel tape sections 118B and 116C, respectively. Scatter surfaces 293A and 293B are disposed between optical bonding layer 220 and the outside edges of pixel tape sections 118B and 116C, respectively. It is appreciated that scatter surface 293B may follow the perimeter of tile 110C between outside edges of pixel tape section 115C-118C and optical bonding layer 220. Similarly, scatter surface 293A may follow the perimeter of tile 110B between outside edges of pixel tape section 115B-118B and optical bonding layer 220 of tile 110B. Scatter surface 293A is positioned to scatter image light received from the pixel array included in pixel tape section 116C (and also pixel tape sections 115C, 117C, and 118C) and scatter surface 293B is positioned to scatter image light received from the pixel array included in pixel tape section 118B (and also pixel tape sections 115B-117B). Scattering image light generated at the outside edges of the pixel arrays may help disguise inter-tile gap 273.

FIG. 2C also illustrates optional scatter surfaces 291 and 292 disposed between optical bonding layer 220 and the inside edge of pixel tape 116C. Scatter surface 291 and 292 can be used individually or in combination. Scatter surface 291 is disposed above encapsulant 315 and scatter surface 292 abuts the inside edge of pixel tape 116C. Scatter surfaces 291 and 292 scatter light 399 generated by display pixels in active display area 112C and light generated by the pixel arrays in the pixel tape sections. Scatter surfaces 291 and 292 serve to disguise the height offset between the pixel tape sections and active display area 112C, especially from oblique viewing angles.

Scatter surface 294 is disposed between the display pixels of display 230 and the pixel tapes 115C-118C. More specifically in FIG. 2C, scatter surface 294 is disposed between the inside edge of pixel tape 116C and color filter layer 248. Since scatter surface 294 is disposed between the pixel tape and the display pixels of display 230, image continuity can be improved from an oblique viewing angle 274. Overlapped pixels 247 allow for image continuity from oblique viewing angle 274 when overlapped pixels display the same color values as the pixels in the pixel array directly above overlapped pixels 247.

Scatter surfaces 291-294 are generally transmissive layers that include diffuse surfaces for scattering light. In one embodiment, some or all of scatter surfaces 291-294 may include micron-scale beads to design—in particular scatter properties. In another embodiment, microlenses are formed using an ink-jet printer that builds up transparent material designed to scatter light in the desired direction.

FIG. 2C shows that the inside edge of pixel tape section 116C overlaps color filter layer 248, which is part of display pixels in active display area 112C. Although not shown, the inside edges of pixel tape sections 115C, 117C, and 118C also overlap display pixels in active display area 112C.

Figure 2D:
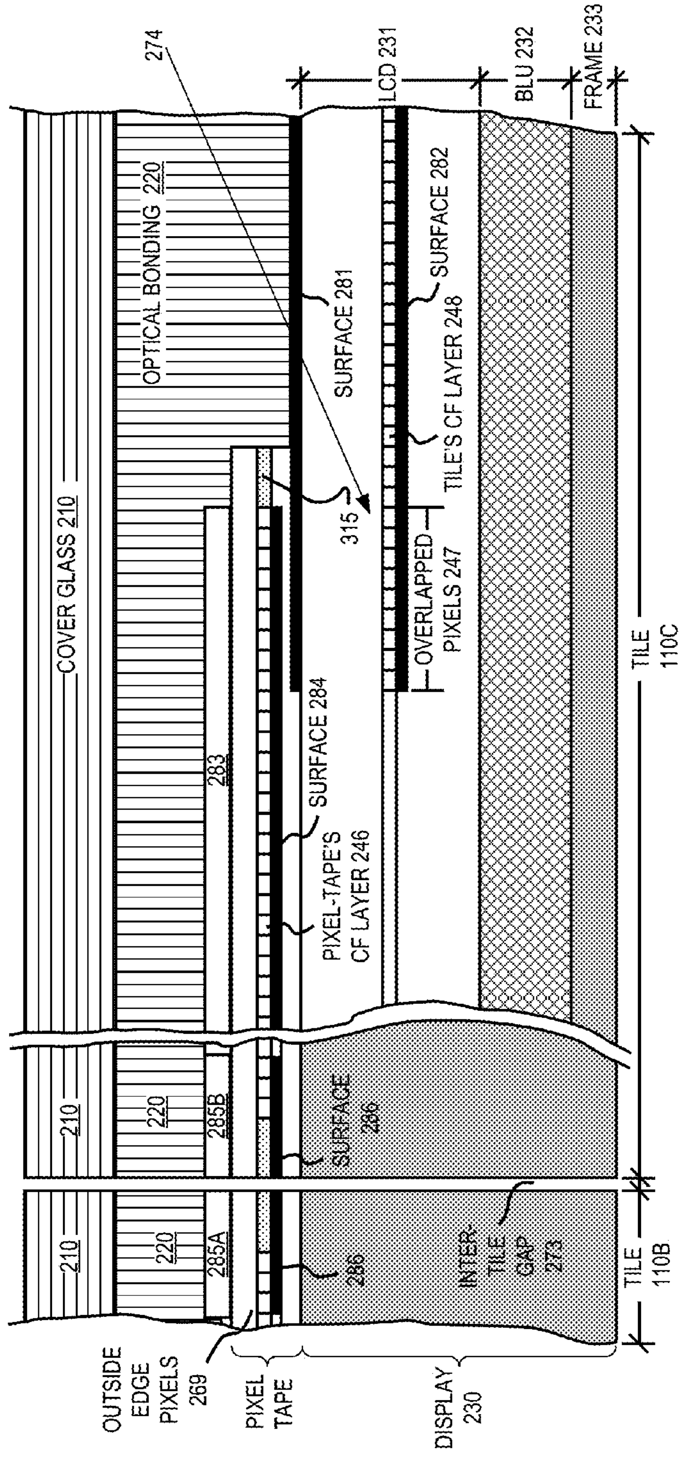
FIG. 2D shows a cross-section view of two example display tiles and an inter-tile gap, in accordance with an embodiment of the disclosure.

FIG. 2D shows a cross-section view of two example display tiles 110B and 110C and inter-tile gap 273, in accordance with an embodiment of the disclosure. The cross-section is along line X3 in FIG. 1B. FIG. 2D is similar to FIG. 2C although certain different options are illustrated in FIG. 2D.

In FIG. 2D, surface 286 is disposed below outside edge color filters of the pixel arrays of pixel tape sections 118B and 116C while also being disposed between the outside edge color filters and the OLEDs that illuminate the outside edge color filters. In one embodiment, surface 286 is an organic layer shaped to pass and scatter light emitted by the outside edge pixels. Microlens or diffractive patterns can be formed or pressed into the organic layer to determine scattering patterns. Surface 286 has the potential advantage of scattering light generated by the pixel arrays in pixel tape sections to disguise inter-tile gap 273.

FIG. 2D also includes surfaces 285A and 285B that are disposed above outside edges of the illustrated pixel tapes. These surfaces can include diffractive or microlens structures to scatter the light generated by outside edge pixels 269. The diffractive or microlens structures can be printed or ultraviolet imprinted.

Surface 283 is disposed above the pixels in the pixel array of the pixel tape sections to decrease viewing angles of the pixel arrays. Surface 283 may make the viewing angle and color filter shift of the OLEDs in pixel tape section 117C worse. Surface 281 is disposed above the display pixels of active display area 112C, but not disposed over the pixel arrays of the pixel tape sections. Surface 281 may be a wide angle viewing film to decrease the difference of color filter shift and gamma at different viewing angles.

Surface 284 can be added as an organic layer with microlens patterns on the surface of color filter layer 246 to make the OLED pixel array's viewing angle and color filter shift worse to match the LCD of display 230. Surface 282 is disposed beneath color filter layer 248 and includes microlens patters configured to increase the viewing angle of LCD 231 and color filter shift.

In one embodiment, different anti-glare ("AG") layers are disposed above the pixel tape sections and above the active display area in the transparent layer of each tile. If the active display area is LCD and the pixel tape sections utilize OLEDs, the different anti-glare layers may homogenize the pixel appearance of the pixels from different technologies. In one embodiment, software calibration is done to adjust the brightness of the OLEDs in the pixel arrays to the brightness of the display pixels in active display area 112C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A display tile for arranging with other display tiles to form a multi-tile display, the display tile comprising:

display pixels in an active display area;

first, second, third, and fourth pixel tapes having first, second, third, and fourth pixel arrays, respectively, wherein the first, second, third, and fourth pixel tapes surround the active display area, and wherein the first pixel array overlaps the second pixel array, the second pixel array overlaps the third pixel array, the third pixel array overlaps the fourth pixel array, and the fourth pixel array overlaps the first pixel array; and a transparent layer disposed over the display pixels and the first, second, third, and fourth pixel arrays, wherein the display pixels and the first, second, third, and fourth pixel arrays are arranged to display an overall image, wherein the overlapping of the first pixel array over the second pixel array results in a portion of the first pixel tape disposed between the transparent layer and the second pixel tape.

2. The display tile of claim 1, wherein the first, second, third, and fourth pixel arrays overlap the display pixels.

3. The display tile of claim 1, wherein the display tile includes an inactive area surrounding the active display area, and wherein the first, second, third, and fourth pixel tapes are adhered above the inactive area.

4. The display tile of claim 1, wherein the first pixel array overlaps a second minority portion of the second pixel array, the second pixel array overlaps a third minority portion of the third pixel array, the third pixel array overlaps a fourth minority portion of the fourth pixel array, and the fourth pixel array overlaps a first minority portion of the first pixel array.

5. The display tile of claim 1, wherein each of the first, second, third, and fourth pixel tapes include an overlapped end, a ramping midsection, and an overlapping end, wherein the ramping midsection is disposed between the overlapped end and the overlapping end, the display tile further comprising ramp supports to support each of the ramping midsections.

6. The display tile of claim 1, wherein the transparent layer includes cover glass and an optical bonding material, wherein the optical bonding material is disposed between the display pixels and the cover glass, and wherein the optical bonding material is also disposed between the first, second, third, and fourth pixel tapes.

7. The display tile of claim 6, wherein the cover glass and the optical bonding material have a same index of refraction.

8. The display tile of claim 1, wherein each of the first, second, third, and fourth pixel arrays include organic light-emitting-diodes ("OLEDs").

9. The display tile of claim 1, wherein each of the first, second, third, and fourth pixel arrays includes a backlit liquid crystal display ("LCD").

10. The display tile of claim 1 further comprising:

scatter surfaces disposed between the transparent layer and inside edges of each of the first, second, third, and fourth pixel tapes, wherein the scatter surfaces are positioned to scatter image light received from the pixel arrays and the display pixels.

11. The display tile of claim 10, wherein the inside edges of each of the first, second, third, and fourth pixel tapes overlap the display pixels.

12. The display tile of claim 1 further comprising:

scatter surfaces disposed between the display pixels and the pixel arrays of the first, second, third, and fourth pixel tapes.

13. The display tile of claim 12, wherein inside edges of each of the first, second, third, and fourth pixel tapes overlap the display pixels.

14. The display tile of claim 1 further comprising:

scatter surfaces disposed between the transparent layer and outside edges of each of the first, second, third, and fourth pixel tapes, wherein the scatter surfaces are positioned to scatter image light received from the pixel arrays of the first, second, third, and fourth pixel tapes.

15. The display tile of claim 1, wherein the pixel arrays of the first, second, third, and fourth pixel tapes include increased pixel density at outside edges of first, second, third, and fourth pixel tapes.

16. The display tile of claim 1, wherein outside edge pixels of the pixel arrays of the first, second, third, and fourth pixel tapes are configured to output more luminance than remaining pixels in the pixel arrays.

17. The display tile of claim 1, further comprising a wide angle viewing film disposed over the display pixels, but not disposed over the pixel arrays.

18. The display tile of claim 1, further comprising a narrow viewing angle film disposed over the pixel arrays to decrease viewing angles of the pixel arrays.

19. The display tile of claim 1, further comprising an organic layer disposed below outside edge color filters that are disposed above OLEDs that illuminate the outside edge color filters, wherein the organic layer is shaped to pass and scatter light emitted by the outside edge pixels.

20. A multi-tile display comprising:

a plurality of display tiles arranged to display a multi-tile image, wherein each display tile in the plurality of display tiles comprises:

display pixels in an active display area;

pixel tape sections that surround the display pixels, wherein each pixel tape section overlaps an adjacent pixel tape section and is overlapped by another adjacent pixel tape section disposed opposite the adjacent pixel tape section, and wherein each pixel tape section includes a pixel array; and a transparent layer disposed over the display pixels and the pixel arrays of the pixel tape sections, wherein the display pixels and the pixel arrays are arranged to display an overall image of the display tile, wherein the overlapping of the adjacent pixel tape section by a given pixel tape section results in a portion of the given pixel tape section disposed between the transparent layer and the adjacent pixel tape section.

21. The multi-tile display of claim 20, wherein the pixel arrays overlap the display pixels.

22. The multi-tile display of claim 20, wherein the display tile includes an inactive area surrounding the active display area, and wherein the pixel tape sections are adhered above the inactive area.

23. The multi-tile display of claim 20, wherein each of the pixel tape sections include an overlapped end, a ramping midsection, and an overlapping end, wherein the ramping midsection is disposed between the overlapped end and the overlapping end, the display tile further comprising ramp supports to support each of the ramping midsections.

* * * * *